(12) United States Patent
Timoszyk et al.

(10) Patent No.: US 12,588,124 B2
(45) Date of Patent: Mar. 24, 2026

(54) METHOD AND SYSTEM FOR MAXIMIZING THE OUTPUT OF SURGICAL LIGHTS

(71) Applicant: Stryker Corporation, Portage, MI (US)

(72) Inventors: Wojciech K. Timoszyk, Flower Mound, TX (US); Dustin R. Campbell, Fort Worth, TX (US)

(73) Assignee: Stryker Corporation, Portage, MI (US)

( * ) Notice: Subject to any disclaimer, the term of this patent is extended or adjusted under 35 U.S.C. 154(b) by 785 days.

(21) Appl. No.: 17/504,476

(22) Filed: Oct. 18, 2021

(65) Prior Publication Data

US 2022/0110201 A1      Apr. 7, 2022

Related U.S. Application Data

(62) Division of application No. 15/225,189, filed on Aug. 1, 2016, now Pat. No. 11,153,953.

(60) Provisional application No. 62/199,309, filed on Jul. 31, 2015.

(51) Int. Cl.
| | |
|---|---|
| *H05B 47/10* | (2020.01) |
| *F21V 23/04* | (2006.01) |
| *G01S 15/88* | (2006.01) |
| *H05B 47/115* | (2020.01) |
| *H05B 47/16* | (2020.01) |

(Continued)

(52) U.S. Cl.
CPC ........ *H05B 47/115* (2020.01); *F21V 23/0471* (2013.01); *G01S 15/88* (2013.01); *H05B 47/16* (2020.01); *F21W 2131/205* (2013.01); *H05B 45/10* (2020.01)

(58) Field of Classification Search
CPC ...... H05B 45/10; H05B 47/10; H05B 47/115; H05B 47/16; F21V 23/0471; F21W 2131/205; G01S 15/88
See application file for complete search history.

(56) References Cited

U.S. PATENT DOCUMENTS

| | | | |
|---|---|---|---|
| 4,517,632 A | 5/1985 | Roos | |
| 4,884,008 A | 11/1989 | Bossler et al. | |
| 6,863,417 B2 | 3/2005 | Hill | |

(Continued)

FOREIGN PATENT DOCUMENTS

| | | |
|---|---|---|
| GB | 2423378 A | 8/2006 |

OTHER PUBLICATIONS

Alexanderson et al., U.S. Office Action dated Mar. 12, 2018, directed to U.S. Appl. No. 15/225,189; 13 pages.

(Continued)

*Primary Examiner* — Jimmy T Vu

(74) *Attorney, Agent, or Firm* — Morrison & Foerster LLP

(57) ABSTRACT

A method of locating light includes providing a housing have a plurality of first light sources therein, the housing further including a plurality of second light sources, the housing further having a handle for changing a position of the housing; illuminating an object with light emitting from the housing from the first light sources; grasping the handle of the housing; turning on the second light sources; illuminating the object with light from the second light sources, with the light from each of the second light sources extending along a line; adjusting a position of the housing to have the second light sources form a point at an area of interest on the object; releasing the handle; and turning off the second light sources.

27 Claims, 16 Drawing Sheets

(51) Int. Cl.
  *F21W 131/205* (2006.01)
  *H05B 45/10* (2020.01)

(56) References Cited

U.S. PATENT DOCUMENTS

| | | | | |
|---|---|---|---|---|
| 8,172,751 | B2 | 5/2012 | Kusner et al. | |
| 8,292,804 | B2 | 10/2012 | Marka et al. | |
| 9,199,668 | B2 | 12/2015 | Zeng et al. | |
| 2003/0014834 | A1* | 1/2003 | Naughton | F21S 9/037 |
| | | | | 16/110.1 |
| 2004/0174592 | A1 | 9/2004 | Sander | |
| 2005/0195601 | A1* | 9/2005 | Marka | F21V 21/403 |
| | | | | 362/244 |
| 2014/0066722 | A1* | 3/2014 | Marka | A61B 90/30 |
| | | | | 600/249 |
| 2014/0268751 | A1 | 9/2014 | Boccoleri et al. | |

OTHER PUBLICATIONS

Alexanderson et al. U.S. Office Action dated Jan. 21, 2021, directed to U.S. Appl. No. 15/225,189; 11 pages.

Alexanderson et al., U.S. Notice of Allowance and Fee(s) Due mailed Jun. 21, 2021, directed to U.S. Appl. No. 15/225,189; 7 pages.

Alexanderson et al., U.S. Office Action dated Aug. 17, 2020, directed to U.S. Appl. No. 15/225,189; 12 pages.

Alexanderson et al., U.S. Office Action dated Jan. 31, 2020, directed to U.S. Appl. No. 15/225,189; 16 pages.

Alexanderson et al., U.S. Office Action dated Jun. 5, 2019, directed to U.S. Appl. No. 15/225,189; 9 pages.

Alexanderson et al., U.S. Office Action dated Nov. 1, 2018, directed to U.S. Appl. No. 15/225,189; 11 pages.

Alexanderson et al., U.S. Restriction Requirement dated Oct. 4, 2017, directed to U.S. Appl. No. 15/225,189; 5 pages.

* cited by examiner

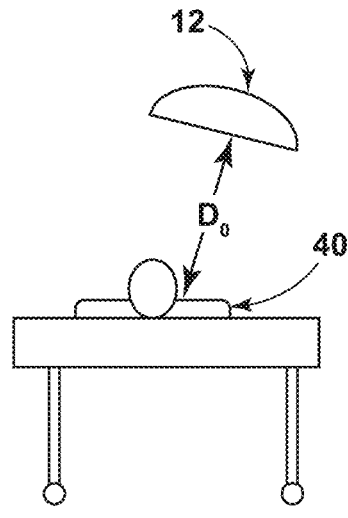
FIG. 4
FIG. 5
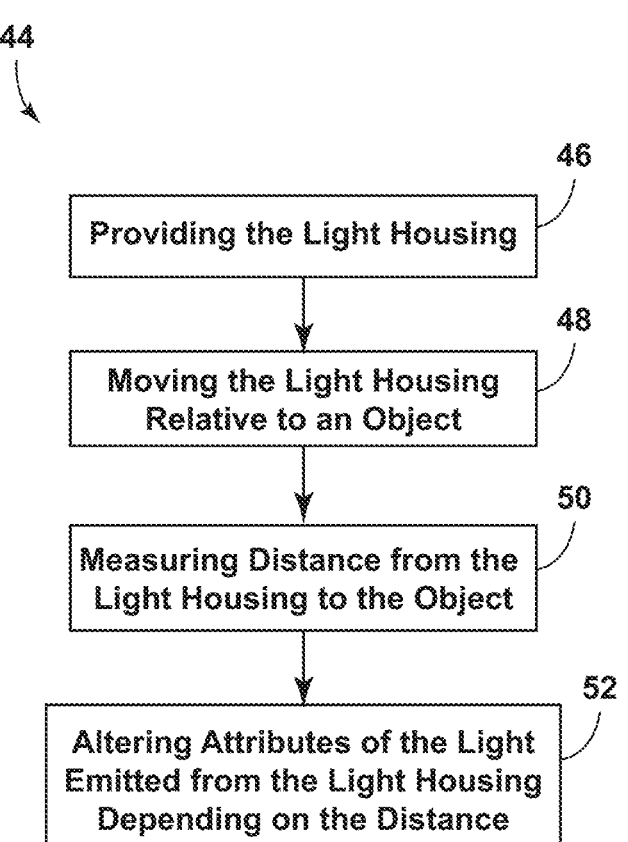
FIG. 6
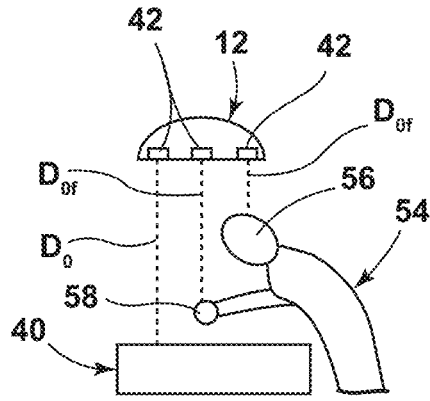
FIG. 7

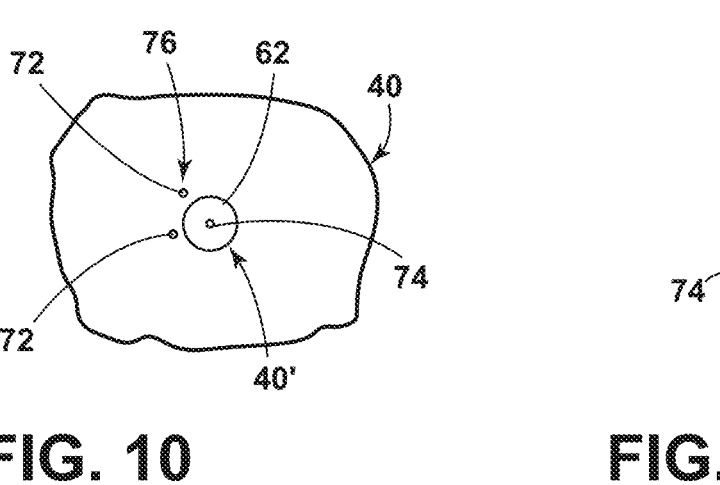
FIG. 10          FIG. 11
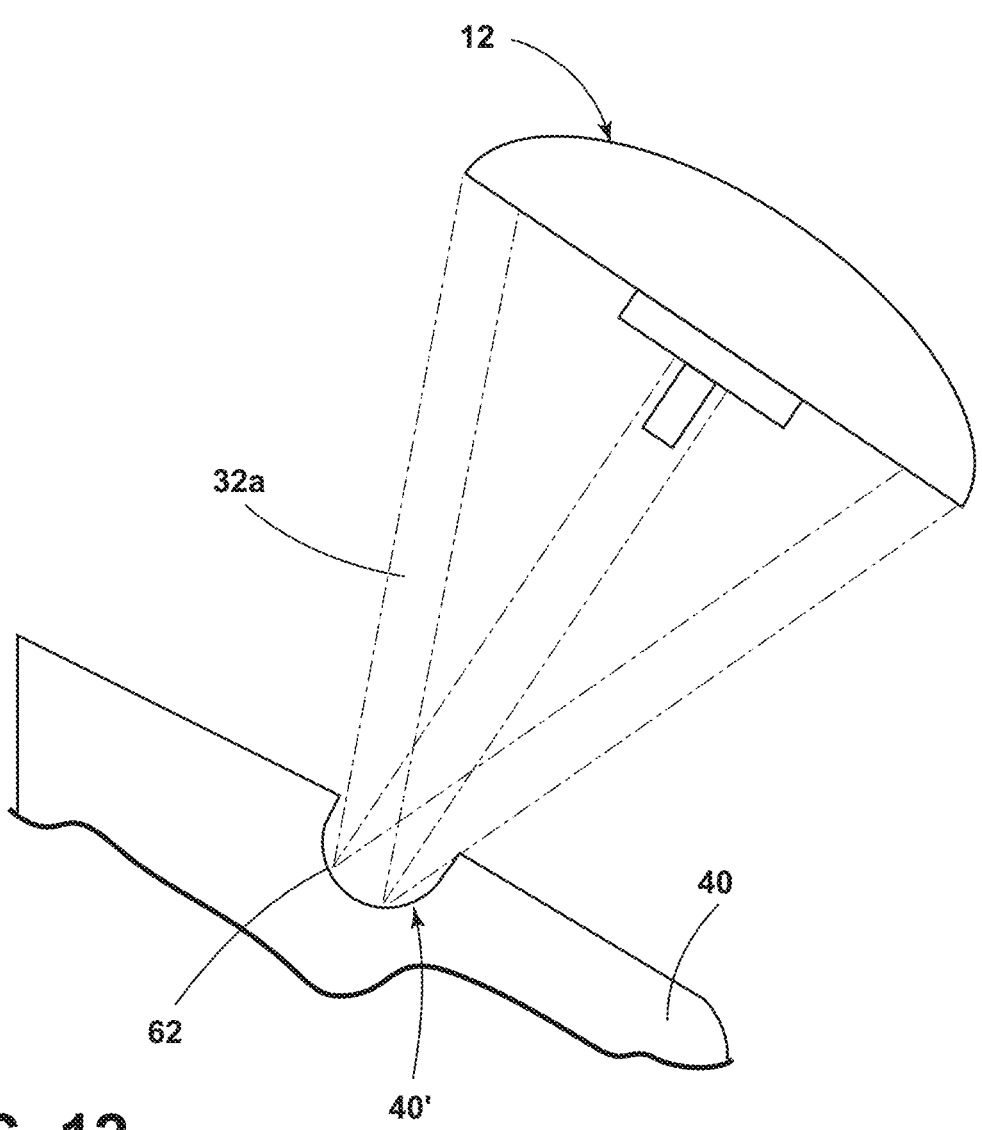
FIG. 12

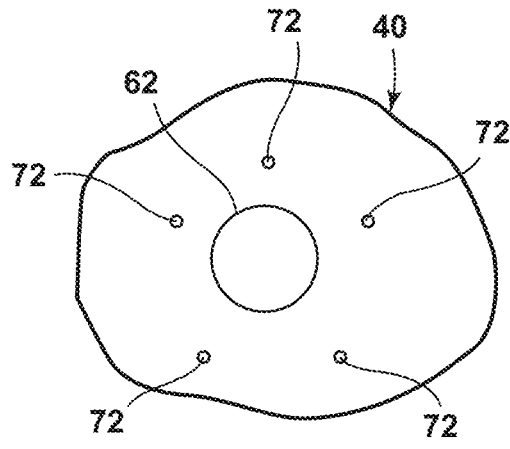

FIG. 13

82 — Providing the Light Housing with Light Emitting Assemblies, Locating Light Pointers and a Handle 84 — Illuminating the Object the Light Emitting Assemblies 86 — Moving the Light Assembly and Emitting Light from the Locating Light Pointers 88 — Adjusting a Position of the Light Assembly to Form a Point of Locating Light 90 — Releasing the Handle 92 — Turning the Locating Light Pointers Off

FIG. 14

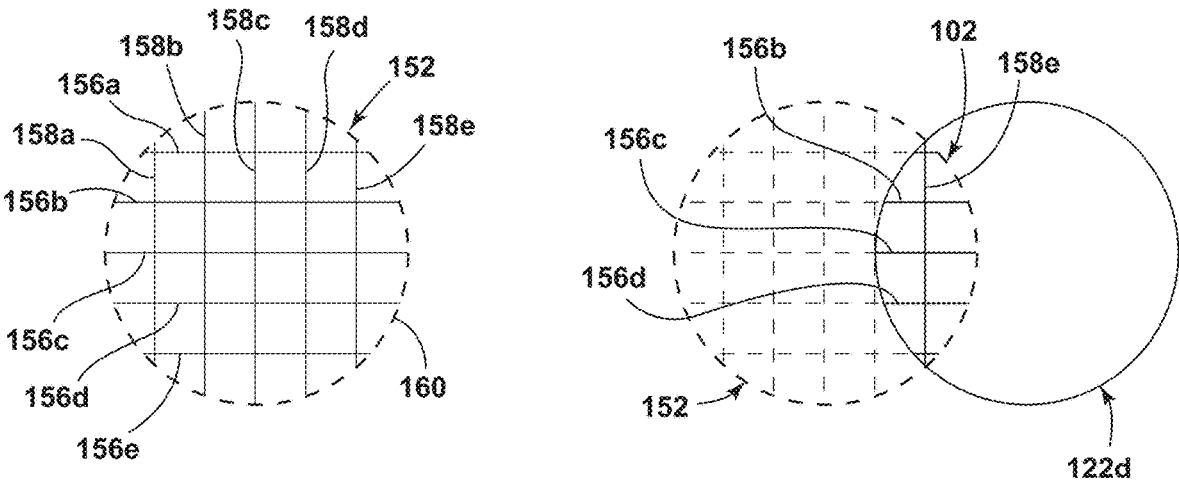
FIG. 22                    FIG. 24
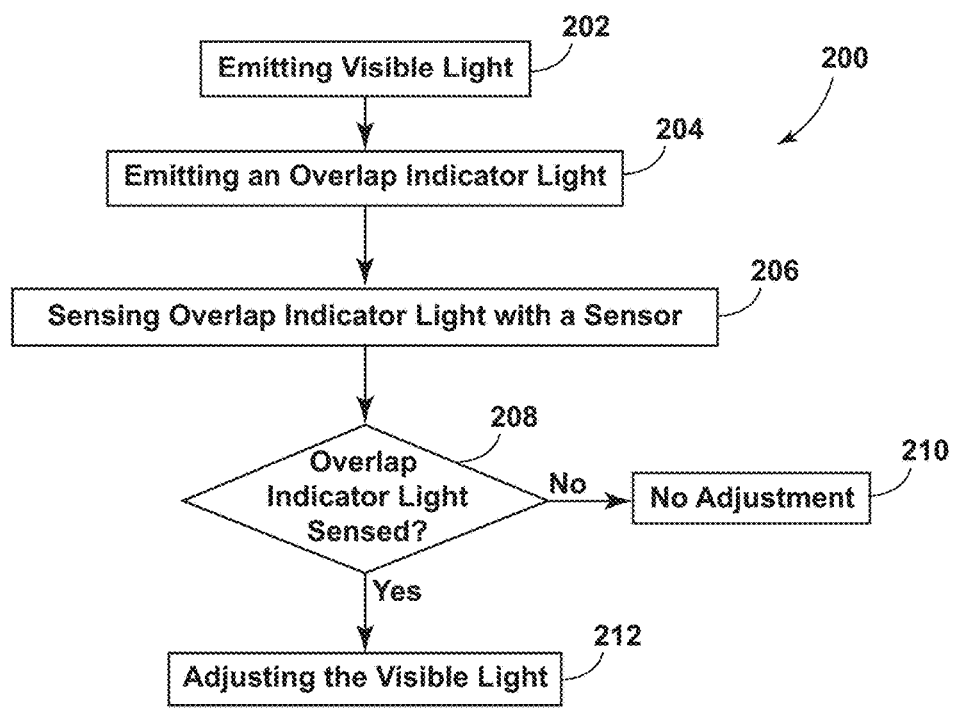
FIG. 25

METHOD AND SYSTEM FOR MAXIMIZING THE OUTPUT OF SURGICAL LIGHTS

CROSS-REFERENCE TO RELATED APPLICATIONS

This application is a divisional of U.S. patent application Ser. No. 15/225,189, filed Aug. 1, 2016, which claims the benefit of U.S. Provisional Application No. 62/199,309, filed Jul. 31, 2015, the entire contents of each of which are hereby incorporated by reference herein.

FIELD OF THE INVENTION

The present invention relates to surgical lights, and in particular to systems and methods for maximizing the output of surgical lights.

BACKGROUND OF THE INVENTION

Surgical lights have been used in operating rooms to provide increased light to a specific area of the room. For example, the surgical light can be positioned within an operating room and can provide increased light to a specific area of a person being operated on within the operating room.

SUMMARY OF THE INVENTION

The present invention, according to one aspect, is directed to a method of illuminating an object including providing a light housing emitting light therefrom, with the light housing including at least one distance sensor, moving the light housing relative to the object to be illuminated, measuring a distance from the light housing to the object to be illuminated with the at least one distance sensor, and altering attributes of the light emitted from the light housing depending on the distance measured by the at least one distance sensor.

Another aspect of the present invention is to provide a surgical light including a housing, at least one light source within the housing and emitting light from the housing, with the light emitted from the housing substantially converging on a focal area, and at least two locating lights emitting visual locating light along a line, with the lines of visible locating light substantially uniting at the focal area.

Yet another aspect of the present invention is to provide a method of locating light including providing a housing having a plurality of viewing light sources therein, with the housing further including at least two visible locating light sources, illuminating an object with light emitting from the housing from the viewing light sources, illuminating the object with visible locating light emitted from the at least two visible locating light sources along a plurality of lines, and adjusting a position of the housing to have the visible locating light form a point at an area of interest on the object.

Another aspect of the present invention is to provide a method of locating light including providing a housing having a plurality of first light sources therein, with the housing further including a plurality of second light sources and a handle for changing a position of the housing. The method further includes illuminating an object with light emitting from the housing from the first light sources, grasping the handle of the housing, turning on the second light sources, illuminating the object with light from the second light sources, with the light from each of the second light sources extending along a line, adjusting a position of the housing to have the second light sources form a point at an area of interest on the object, releasing the handle, and turning off the second light sources.

Yet another aspect of the present invention is to provide a surgical light including a first light housing connected to a first light housing arm, with the first light housing emitting first visible light, and a second light housing connected to a second light housing arm, with the second light housing emitting second visible light. The first light housing emits an overlap signal. The second light housing has a sensor for sensing the overlap signal. A control system adjusts the first visible light and/or the second visible light when the sensor senses overlap of the first visible light and the second visible light.

Another aspect of the present invention is to provide a method of adjusting light emitted from a surgical light including providing a first light housing connected to a first light housing arm, providing a second light housing connected to a second light housing arm, emitting first visible light from the first light housing, emitting second visible light from the second light housing, emitting an overlap signal from the first light housing, providing the second light housing with a sensor, sensing the overlap signal with the sensor, and adjusting the first visible light and/or the second visible light when the sensor senses overlap of the first visible light and the second visible light.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

FIG. 4 illustrates a patient being illuminated by the surgical light of the present invention.

FIG. 5 illustrates a measurement of the surgical light of a first embodiment of the present invention to an object to be viewed.

FIG. 6 illustrates a method of illuminating the object according to a first embodiment of the present invention.

FIG. 7 illustrates a measurement of the surgical light of the present invention to the object to be viewed with a person partially blocking the light from the surgical light.

FIG. 10 illustrates the object being viewed when the surgical light of the present invention is misaligned.

FIG. 11 illustrates the object being viewed when the surgical light of the present invention is properly aligned and at a predetermined distance.

FIG. 12 is a side view of the surgical light of the present invention when the surgical light of the present invention is properly aligned and at the predetermined distance.

FIG. 13 illustrates the object being viewed when the surgical light of the present invention is closer or further than the predetermined distance to the object being viewed.

FIG. 14 illustrates a method of locating light to illuminate the object according to the second embodiment of the present invention.

FIG. 22 is the grid of light emitted from the surgical light of the third embodiment of the present invention.

FIG. 24 illustrates overlapping light from the light assemblies of the surgical light of the third embodiment of the present invention.

FIG. 25 illustrates a method of adjusting light emitted from a surgical light according to the third embodiment of the present invention.

Figure 1:
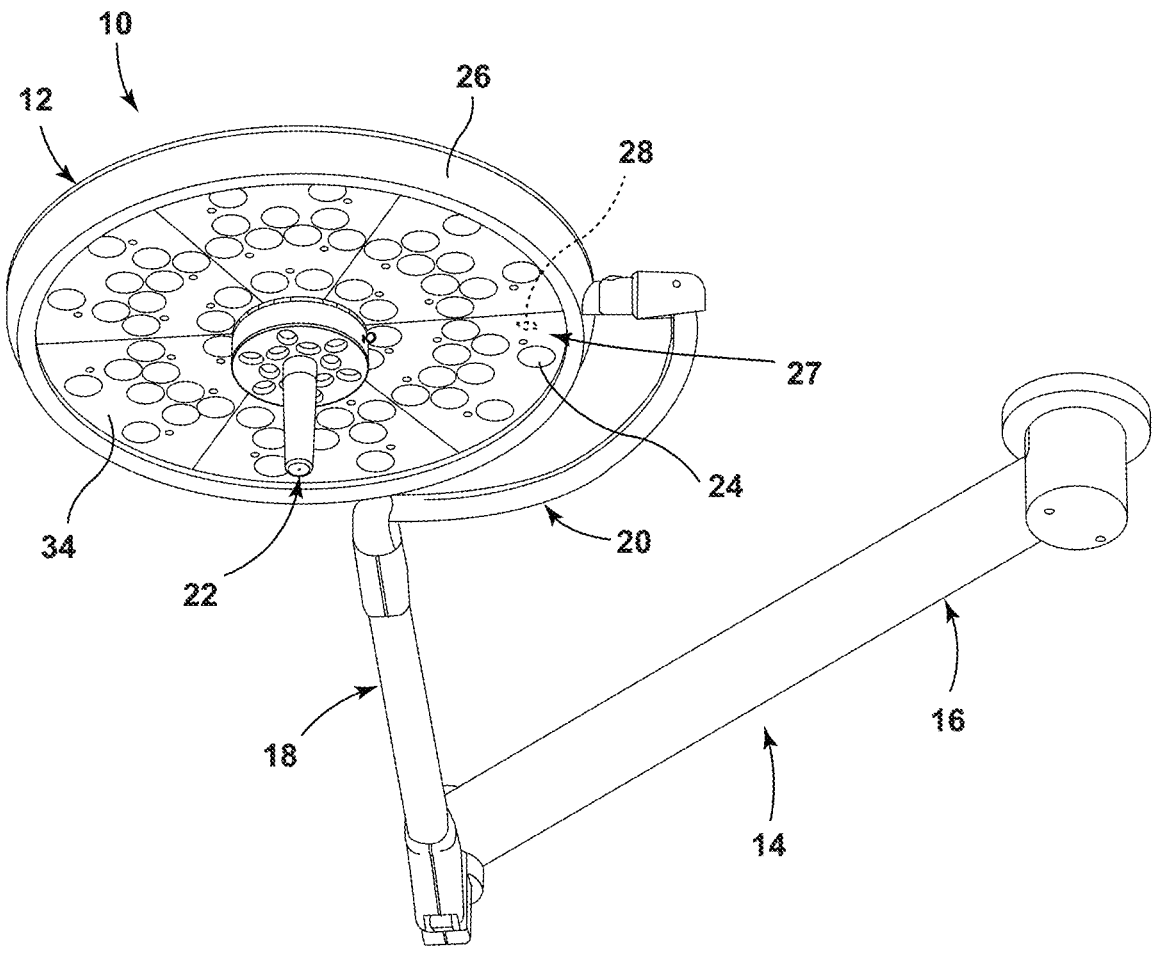
FIG. 1 is a perspective view of a surgical light of the present invention.

The specific devices and processes illustrated in the attached drawings, and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a surgical light. The surgical light 10 is configured to be positioned within a room (e.g., operating room) and to provide increased light to a specific area of the room. While the surgical light 10 can be placed within an operating room, the surgical light 10 can also be placed in any area wherein increased light at a targeted location is desired. The surgical light 10 includes a light assembly 12 and an arm 14 for connecting the light assembly 12 to a static or movable structure within the operating room. For example, the arm

14 can be directly connected to a suspension system connected to a wall or ceiling of the operating room, can be connected to a further arm assembly (not shown) or suspension system directly connected to a wall or ceiling of the operating room, or can be directly or indirectly connected to a movable assembly located within the operating room.

In the illustrated example, the arm 14 of the surgical light 10 allows light from the light assembly 12 to be pointed or concentrated at a certain area within the operating room (with the suspension system allowing the light assembly 12 to be selectively positioned within the operating room). The arm 14 includes a first arm member 16 configured to be rotatably connected to a support (e.g., a ceiling), a second arm member 18 rotatably connected to the first arm member 16, and a curved link 20 extending between the second arm member 18 and the light assembly 12. The first arm member 16, the second arm member 18 and the curved link 20 allow the light assembly 12 to be moved to any desired location by grasping a handle assembly 22 extending from a circular face plate 34 of the light assembly 12 and pulling, pushing and/or twisting the light assembly 12 to any desired location. While a specific arm 14 is illustrated in FIG. 1, any arm well known to those skilled in the art could be used to connect the light assembly 12 to the operating room structure or a movable assembly as discussed above (including one connected to multiple points on the side of the light assembly 12 and/or the rear surface thereof). The illustrated arm 14 or any arm known to those skilled in the art allows for easy movement of the light assembly 12 into any position within the operating room and then maintaining the position of the light assembly 12 once released.

The illustrated light assembly 12 provides increased light to a targeted area of an operating room. The light assembly 12 includes a housing 26 having at least one light emitting assembly 27. Each light emitting assembly 27 includes a light source 28 (e.g., an LED or a plurality of LEDs) covered by light directing optics 24. The housing 26 includes the circular face plate 34 covering the at least one light emitting assembly 27, with the handle assembly 22 for moving the light assembly 12 extending from the center of the circular face plate 34. The handle assembly 22 can also be used for turning on, turning off, or increasing and decreasing, for example, the intensity, spot size or color of the light emitted by the light emitting assembly 27 within the light assembly 12. Housings for light assemblies and the light sources and optics therein are well known to those skilled in the art. For example, the housing, light source and optics can be those of U.S. Patent Application Publication No. 2014/0268751 entitled SURGICAL LIGHT WITH BEAM REDIRECTING OPTICS, the entire contents of which are incorporated herein by reference.

Figure 2:
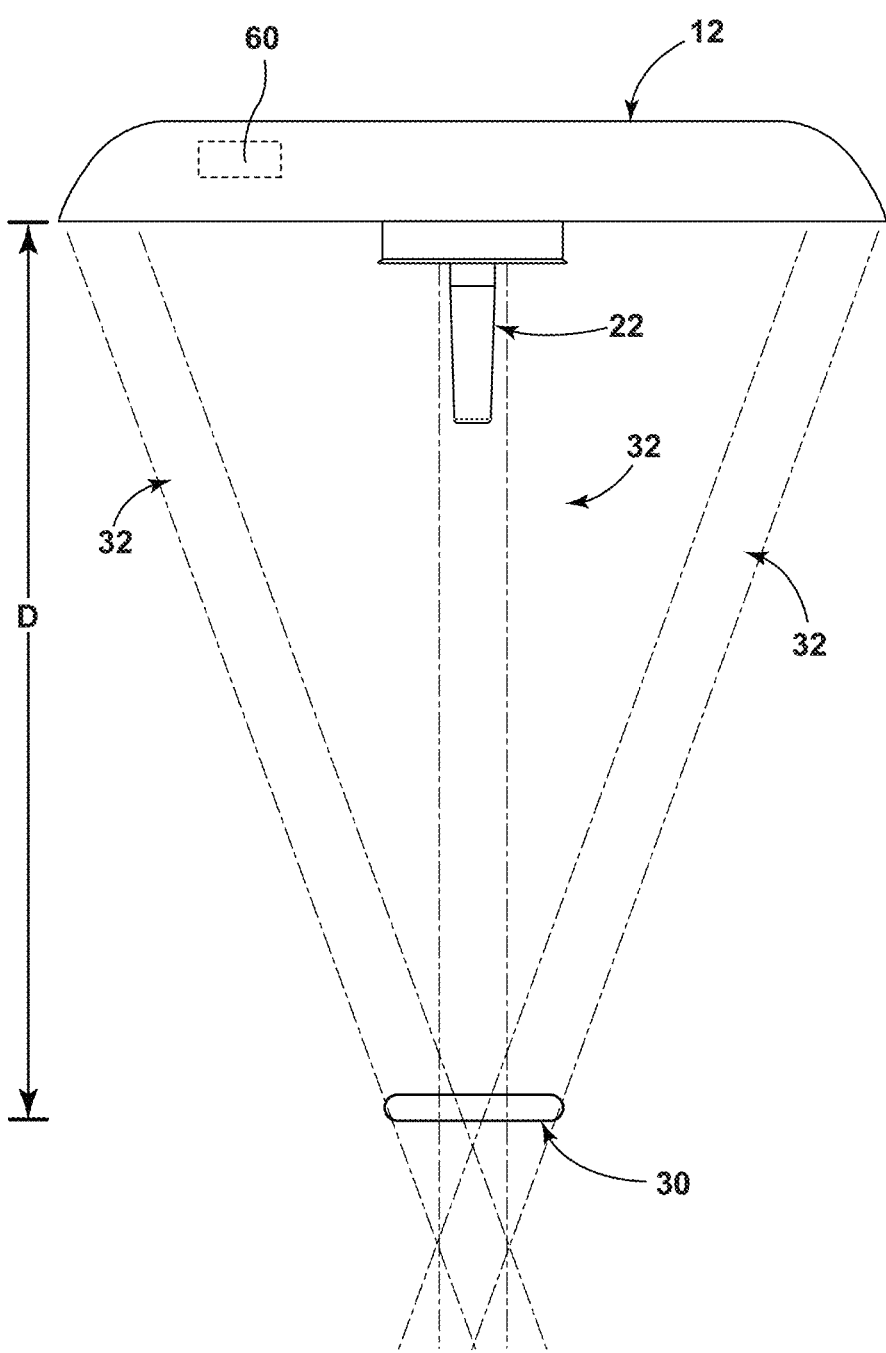
FIG. 2 is a side view of the surgical light of the present invention emitting light.
Figure 3:
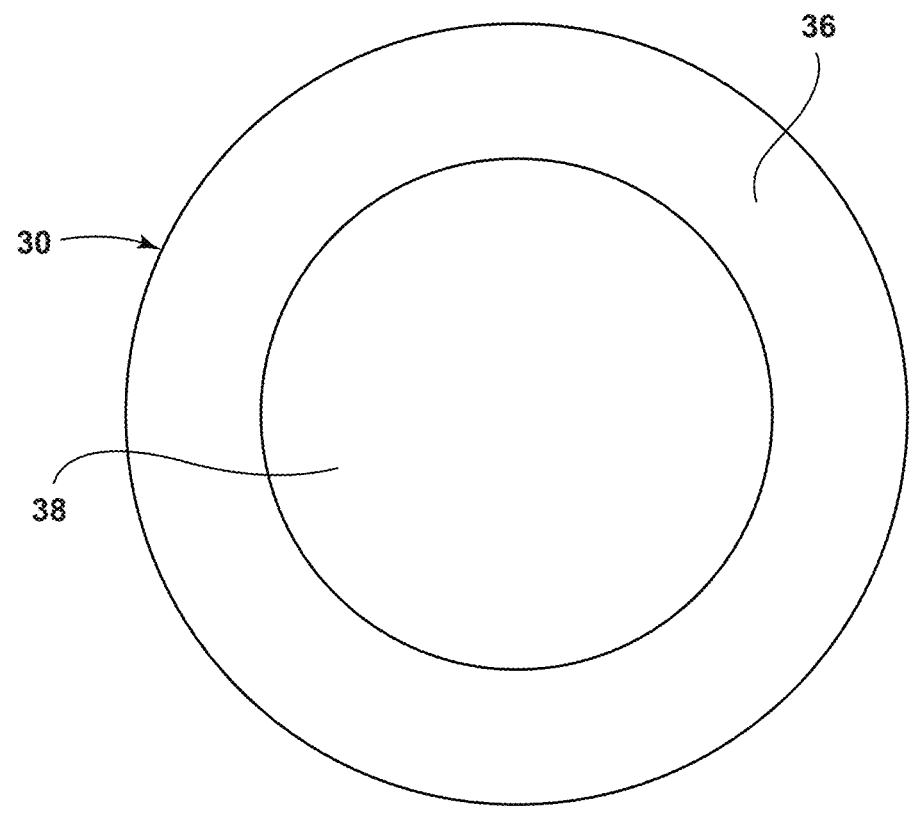
FIG. 3 illustrates a focal area of light emitted by the surgical light of the present invention.

FIG. 2 illustrates a focal area 30 of the light being emitted by the light assembly 12. Each of the light emitting assemblies 27 emits a beam of light 32, with only three of the beams of light 32 being illustrated in FIG. 2 for clarity. While the beams of light 32 are shown as being cylindrical, the beams of light 32 can be generally conical with a taper because of the shape of the light directing optics 24 and/or diffusion of light. All of the beams of light 32 emitted from the light emitting assemblies 27 converge at the focal area 30 at a certain distance D from the light assembly 12. The light emitted from the light assembly 12 at the focal area 30 is illustrated in FIG. 3, which includes a central area 38 (or light field center) wherein the light emitted from separate light emitting assemblies 27 overlaps and reaches maximum lux intensity and an outer ring 36 surrounding the central area 38 that is lighter in intensity than the central area 38 because the outer ring 36 does not have substantially over-lapping light. The intensity of the central area 38 is greatest at the focal area 30 as the focal area 30 is the point when most of the light emitted from the separate light emitting assemblies 27 overlaps. The diameter of the central area 38 and the outer ring 36 is also smallest at the focal area 30, with the diameter increasing above and below the focal area 30 (along with the intensity of the light diminishing above and below the focal area 30). It is contemplated that the size of the focal area 30 of the light assembly 12 and the distance D can be adjusted by altering attributes of the light emitting assemblies 27. For example, the intensity of the light emitted from each or selected ones of the light emitting assemblies 27 can be adjusted, an angle of the light emitted from the light emitting assemblies 27 can be adjusted or some of the light emitting assemblies 27 can be turned off.

In the illustrated example, the light assembly 12 is con-figured to optimize the attributes of the light emitted from the light assembly 12 when an object to be illuminated is at a certain distance from the light assembly 12. For example, the light assembly 12 is configured such that the light field diameter (diameter of light field at the focal area 30), central illuminance (illuminance (measured in lux) at the focal area 30), and light distribution are optimized at the focal area 30. Typically, the attributes of the light emitted from the light assembly 12 are optimized when an object 40 is one meter from the light assembly 12. However, with a person moving the light assembly 12, the light assembly 12 is not always located at the certain distance (e.g., one meter) from the light assembly 12 for optimizing the attributes of the light assembly 12.

A first embodiment of the present invention allows for adjustment of attributes of the light assembly 12 depending on a distance $D_o$ of the light assembly 12 to the object 40 being viewed (for example, a patient during a medical procedure as illustrated in FIG. 4). In the first embodiment of the present invention, the light assembly 12 measures the distance $D_o$ and adjusts the attributes of the light assembly 12 as if the distance $D_o$ of the light assembly 12 to the object 40 is equal to the distance D to the focal area 30. As illustrated in FIG. 5, the light assembly 12 can include a distance sensor 42 for measuring the distance $D_o$ from the light assembly 12 to the object 40. The distance sensor 42 can use visible light, infrared light, ultrasonic waves or any other known output for measuring the distance $D_o$ from the light assembly 12 to the object 40. Such distance sensors 42 are well known to those skilled in the art. An example of the distance sensor 42 that could be used is the SHARP GP2Y0A60SZ0F or SHARP GP2Y0A60SZLF distance measuring sensor unit as sold by Sharp Corporation of Osaka, Japan.

FIG. 6 illustrates a method 44 of illuminating the object 40. The method 44 includes providing the light assembly 12 with the distance sensor 42 and emitting light from the light housing 26 at step 46. The method 44 then includes moving the light assembly 12 relative to the object 40 to be illumi-nated at step 48. Since movement of the light assembly 12 is typically done manually (or even when not done manu-ally), the object 40 is typically not at the certain distance D such that the object 40 is not optimally illuminated. There-fore, the distance $D_o$ from the light housing to the object to be illuminated is measured at step 50 after the light assembly 12 is no longer being moved.

In the method 44, as a result of the measured distance $D_o$, a control system 60 for the light assembly 12 in the light assembly 12 as illustrated in FIG. 2 or located remote from the light assembly 12 will alter attributes of the light emitted from the light assembly 12 depending on the distance $D_o$ measured by the distance sensor 42 at step 52. The altered attributes will be adjusted as if the distance $D_o$ of the light assembly 12 to the object 40 was equal to the distance D to the focal area 30. The altered attributes can include altering the light field diameter (diameter of light field at the distance $D_o$), altering the central illuminance (illuminance (measured in lux) at the distance $D_o$), altering the light distribution at the distance $D_o$, and/or altering another attribute. As outlined above, the attributes can be altered by, for example, adjust-ing the intensity of the light emitted from each or selected ones of the light emitting assemblies 27, adjusting an angle of the light emitted from the light emitting assemblies 27 or turning on or off some of the light emitting assemblies 27. The attributes can be altered in other manners known to those skilled in the art.

In the illustrated example, a surgeon, nurse or other person 54 may position themselves (at least temporarily) between the light assembly 12 and the object 40 (see FIG. 7). For example, a head 56 of the surgeon, nurse or other person 54 may be located between the light assembly 12 and the object 40 to allow the surgeon, nurse or other person 54 to obtain a better view of an area of the object 40. Likewise, a hand 58 of the surgeon, nurse or other person 54 may be located between the light assembly 12 and the object 40 during surgery. In such a situation, it is contemplated that the light assembly 12 could include a plurality of distance sensors 42, with each of the distance sensors 42 measuring the distance $D_o$. Since some of the distance sensors 42 will give a false distance $D_{of}$ reading because of the head 56, hand 58 or other portion of the surgeon, nurse or other person 54 (or any other article), the longest distance $D_o$ from all of the distance sensors 42 will be used in step 50 of the method 44 for the most accurate distance $D_o$ measurement.

Figure 8:
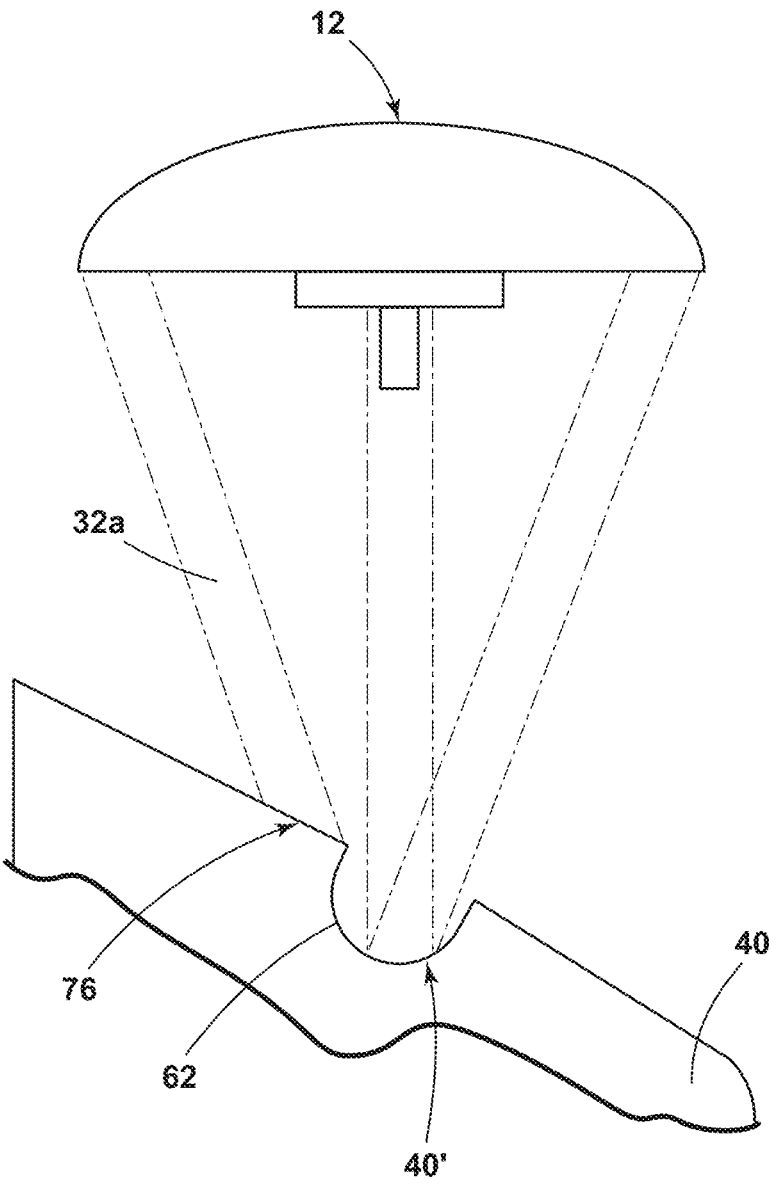
FIG. 8 illustrates light being emitted by the surgical light of the present invention, with the light not fully extending into a recess.

A second embodiment of the present invention ensures that the light assembly 12 is adjusted and angled to provide optimal illumination to the object 40, and in particular to an area of interest 40' of the object 40 (see FIG. 8). During some surgical procedures, the area of interest 40' on the object 40 can be located in a recess 62, such as an opening made in the body during surgery. If the light assembly 12 is at a non-optimal angle or non-optimal distance to the recess 62 as illustrated in FIG. 8, some areas of the recess 62 will not be illuminated and could appear as in a shadow such that the area of interest 40' is not optimally illuminated. As illustrated in FIG. 8, one of the beams of light 32a emitted from the light assembly 12 does not extend into the recess 62 because of the angle of the light assembly 12 and instead illuminates an area 76 of the object 40 outside of the area of interest 40'. The second embodiment of the present invention assists the user in optimally positioning and orientating the light to ensure that the light assembly 12 is properly angled to provide an optimal number of beams of light 32 into the recess 62.

Figure 9A:
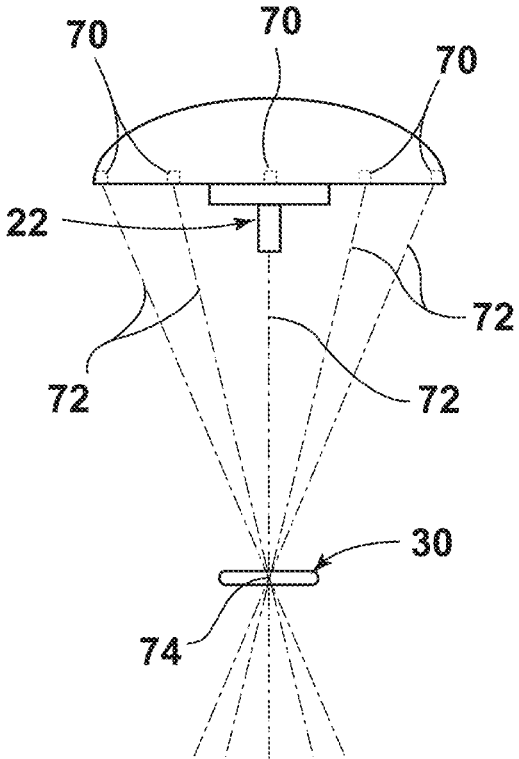
FIG. 9A is a side view of a surgical light of a second embodiment of the present invention.
Figure 9B:
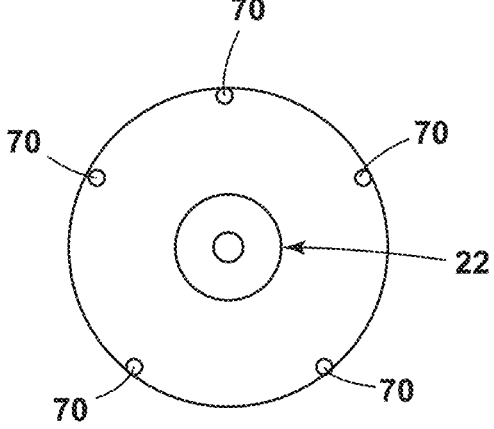
FIG. 9B is a bottom view of the surgical light of the second embodiment of the present invention.

In the illustrated example, the light assembly 12 includes a plurality of locating light pointers 70 emitting visible locating light 72 along a line for assisting in properly adjusting and angling the light assembly 12 to provide optimal illumination to the area of interest 40' on the object 40. The locating light pointers 70 are aligned to have the lines of visible locating light 72 from all the locating light pointers 70 meet at a single dot 74 in the focal area 30. The locating light pointers 70 can be lasers or can be any other device that emits narrowly collimated light beams (e.g., a superluminescent diode). As illustrated in FIGS. 9A and 9B, the locating light pointers 70 can be located adjacent the periphery of the housing 26 of the light assembly 12.

However, it is contemplated that at least some of the locating light pointers 70 could be located closer to the handle assembly 22 (e.g., at the same radius as the outermost light emitting assembly 27 or even closer). Furthermore, while five locating light pointers 70 are illustrated in FIGS. 9A and 9B, two or more locating light pointers 70 could be used (all at the same radius or at various radii).

FIG. 10 illustrates the object 40 wherein the light assembly 12 is not optimally orientated in order to provide light into the recess 62 at the area of interest 40' of the object 40 (when the light assembly 12 is at the position illustrated in FIG. 8). As shown in FIG. 10, two of the lines of visible locating light 72 will form a dot at the area 76 of the object 40 outside of the area of interest 40'. Three of the lines of visible locating light 72 will form a single dot 74 at the area of interest 40'. A person using the light assembly 12 will view the dot (or dots) outside of the area of interest 40' and know that that light assembly 12 is not at the optical angle for illuminating the area of interest 40'. The light assembly 12 can then be adjusted (e.g., by moving the light assembly 12 with the handle assembly 22) until all of the lines of visible locating light 72 will form a single dot 74 at the area of interest 40' (or approximating a single dot as close as possible) as illustrated in FIG. 11. FIG. 12 illustrates the light assembly 12 after the light assembly 12 has been adjusted to have all of the lines of visible locating light 72 form a single dot at the area of interest 40' (or approximating a single dot as close as possible) as illustrated in FIG. 11 such that light 32 from the light emitting assemblies 27 forms the focal area 30 at the area of interest 40'. FIG. 13 illustrates a condition when the light assembly 12 is appropriately angled, but is too far or too close to the area of interest 40'. In this situation, the visible locating light 72 forms a plurality of dots surrounding the area of interest 40'. The locating light 72 can be adjusted to form a single dot by moving the light assembly 12 closer to or further away from the object of interest 40' in such a manner that the dots converge to form a single dot.

FIG. 14 illustrates a method 80 of locating light to illuminate the object 40. The method 80 includes providing the light assembly 12 with a plurality of light emitting assemblies 27, a plurality of the locating light pointers 70 and the handle assembly 22 at step 82. The method 80 then includes illuminating the object 40 with light emitting from the light emitting assemblies 27 of the light assembly 12 at step 84. A user then grasps the handle assembly 22 and moves the light assembly 12 at step 86, with the locating light pointers 70 emitting locating light during movement of the light assembly 12. It is contemplated that the locating light pointers 70 could automatically illuminate when the handle assembly 22 is touched, when a button on the handle assembly 22 is depressed, or when some other mechanism for illuminating the locating light pointers 70 is employed. For example, it is contemplated that the handle assembly 22 could employ a capacitance touch system under control of the control system 60 for illuminating the locating light pointer 70 such that the locating light pointers 70 are illuminated when the handle assembly 22 is grasped. It is further contemplated that the capacitance touch system could be used to lock the light assembly 12 in a selected position once the handle assembly 22 is released. A capacitance touch system that releases all joint locks (e.g., those between the arm 14 and the light assembly 12 and at every joint of the arm 14) when the handle assembly 22 is grasped and that locks all joint locks when the handle assembly 22 is released is described in U.S. Pat. No. 4,517,632 entitled OPERATING THEATRE LAMP, the entire contents of which are incorporated herein by reference. If the light assembly 12 employs the capacitance touch system, it is contemplated that the capacitance touch system for illuminating the locating light pointers 70 could be disabled with a switch or a setting of the control system 60 (to have the locating light pointers 70 remain off if there is no other control for the locating light pointers 70 or only turn on under actuation of the other control (e.g., a manual switch) if there is other control for the locating light pointers 70).

In the illustrated example, after the locating light pointers 70 illuminate the object 40 at step 86, the light assembly 12 is adjusted at step 88 to have the locating light 72 from the locating light pointers 70 substantially form a point 74 at the area of interest 40' on the object 40. It is contemplated that the light assembly 12 could have a camera or other sensor that monitors the locating light 72 during movement at step 88 and a control system interacting with the camera or other sensor can provide feedback (e.g., varying vibrations in the handle assembly 22, auditory sounds (e.g., beeps) or visual indicia) when the locating light 72 is diverging to let the user know the light assembly 12 is moving away from an optimal orientation (or conversely when the locating light is converging to let the user know the light assembly 12 is moving toward an optimal orientation). The handle assembly 22 is then released at step 90 and the locating light pointers 70 are turned off at step 92. It is contemplated that the control system 60 can be programmed to turn the locating light pointers 70 off at step 92 a certain time after the step 90 of releasing the handle assembly 22. For example, it is contemplated that the control system 60 (e.g., as part of the capacitance touch system) can control the locating light pointers 70 to turn off five to ten seconds after the step 90 of releasing the handle assembly 22. Alternatively, the locating light pointers 70 could turn off as soon as the handle assembly 22 is released.

Figure 15:
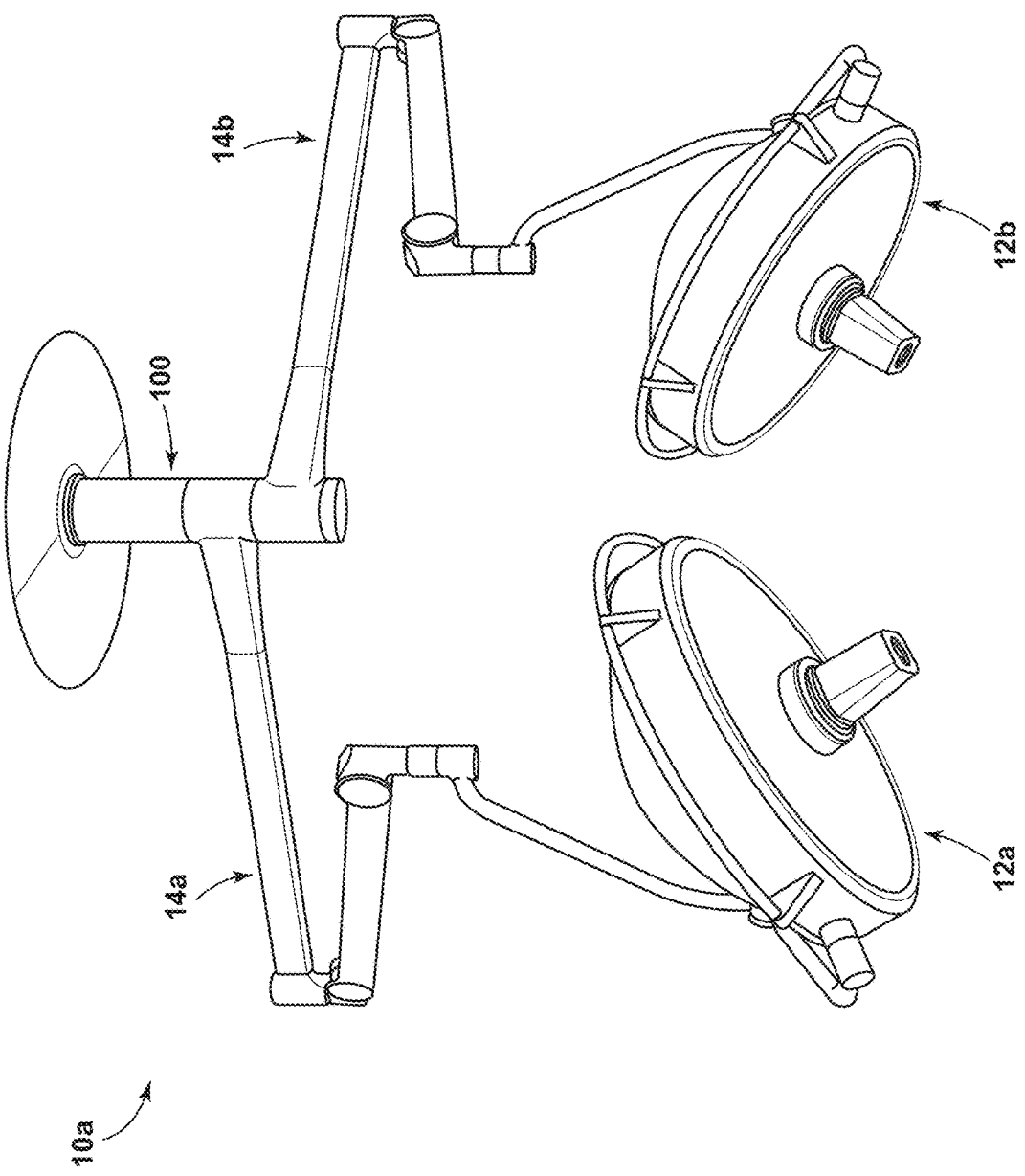
FIG. 15 is a perspective view of a surgical light of a third embodiment of the present invention.
Figure 16:
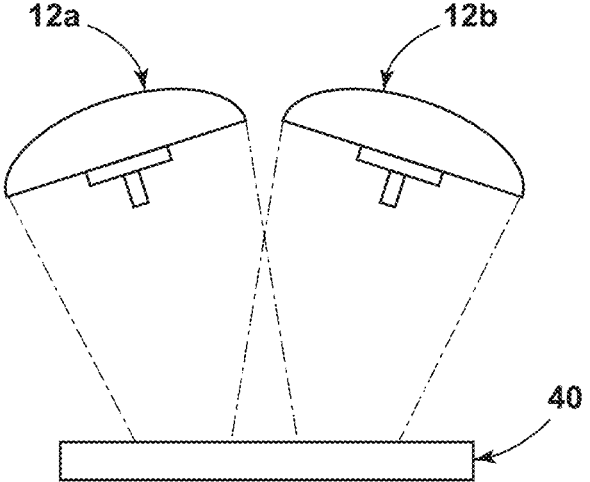
FIG. 16 is a side schematic view of the surgical light of the third embodiment of the present invention.
Figure 17:
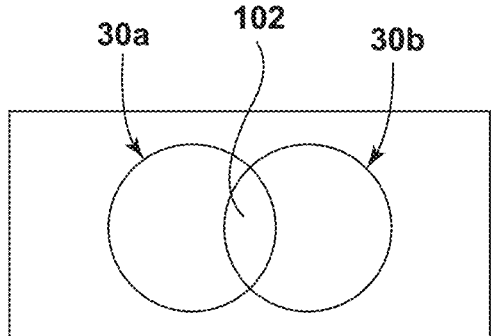
FIG. 17 is a top view of the object being illuminated with the surgical light of the third embodiment of the present invention when light from a pair of light assemblies overlaps.

A third embodiment of the present invention ensures that light from multiple light assemblies 12 do not overlap to exceed recommended maximum light output. FIG. 15 illustrates a surgical light 10a having a pair of light assemblies 12a, 12b, with each light assembly 12a, 12b being connected to a common hub 100 by arms 14a, 14b. Each of the light assemblies 12a, 12b emits light from at least one light emitting assembly 27 as outlined above. As illustrated in FIG. 16, the light assemblies 12a, 12b emit light in the same direction onto the object 40. FIG. 17 illustrates an area of overlap 102 of the focal area 30a from the first light assembly 12a and the focal area 30b from the second light assembly 12b. Even if the focal area 30a and the focal area 30b are not exactly on the object 40 as illustrated in FIG. 17 (that is, if distance D does not equal the distance $D_o$), the light from the first light assembly 12a and the second light assembly 12b will still overlap at the area of overlap 102. The third embodiment of the present invention alters the output of the first light assembly 12a and/or the second light assembly 12b to maintain the intensity of the light at the area of overlap 102 below a recommended level (e.g., 160,000 lux). Maintaining the intensity of the light at the area of overlap 102 below a recommended level will help prevent eye fatigue to the user or dehydration and excessive radiation of a bodily area, such as a wound, at the area of overlap 102.

Figure 18:
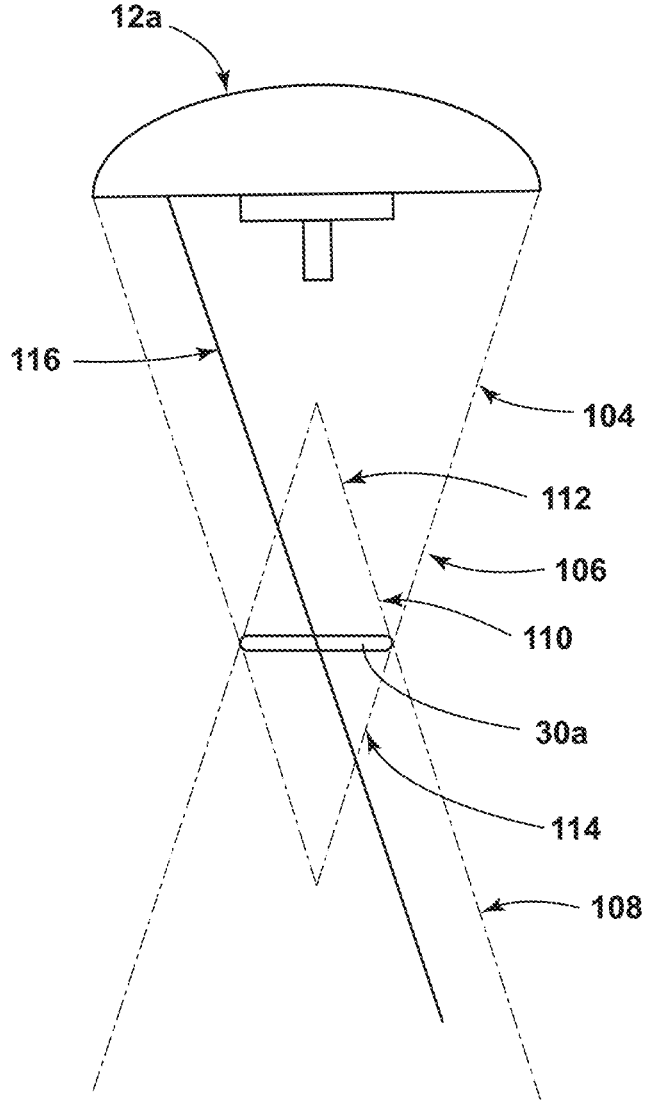
FIG. 18 is a schematic side view of a first light assembly of the surgical light of the third embodiment of the present invention.

In the third embodiment of the present invention, a first one of the light assemblies 12 senses the area of overlap 102 by having the first one of the light assemblies 12 emit infrared light and by having a second one of the light assemblies 12 sense the infrared light emitted from the first one of the light assemblies 12. FIG. 18 illustrates the light assembly 12a emitting light 104. The light 104 emitted from the light assembly 12a forms an upper frustum cone 106 between the light assembly 12a and the focal area 30a and a lower frustum cone 108 below the focal area 30a. The light 104 also forms an area 110 of higher intensity including the focal area 30a, an upper cone 112 of higher intensity light and a lower cone 114 of higher intensity light, with the focal area 30a having the highest intensity. As illustrated in FIG. 18, the light assembly 12a can emit a beam of infrared light 116 to be sensed by another one of the light assemblies 12b. It is contemplated that the beam of infrared light 116 can pass through any point of the focal area 30a absent blockage of the beam (e.g., through the center of the focal area 30a as illustrated in FIG. 18). Furthermore, it is contemplated that a plurality of beams of infrared light 116 could be emitted from the light assembly 12a.

Figure 19:
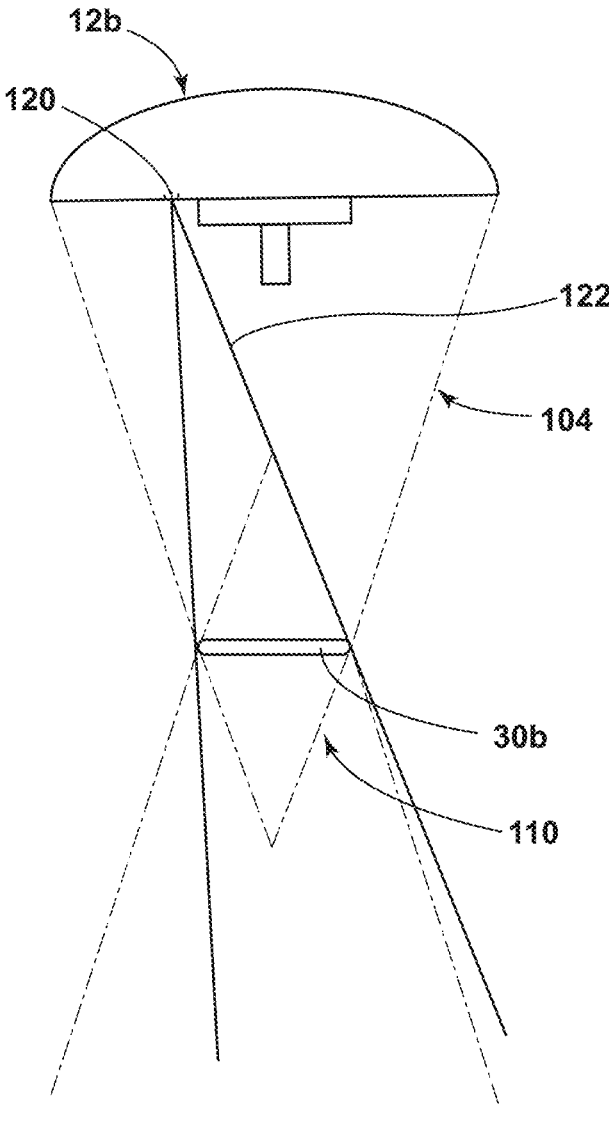
FIG. 19 is a schematic side view of a second light assembly of the surgical light of the third embodiment of the present invention.

FIG. 19 illustrates the light assembly 12b having a sensor 120 for sensing the beam of infrared light 116 emitted from the first light assembly 12a. The light assembly 12b also emits the light 104 having the area 110 of higher intensity as does the light assembly 12a emitting the beam of infrared light 116. The sensor 120 has a field of view 122 that encompasses both the area 110 of higher intensity and the focal area 30b. As illustrated in FIG. 19, the field of view 122 of the sensor 120 has a periphery that is substantially co-extensive with the periphery of the focal area 30b. However, it is contemplated that the field of view 122 of the sensor 120 could include more area than the focal area 30b. Moreover, it is contemplated that the light assembly 12b could include a plurality of the sensors 120 creating multiple fields of view 122. Furthermore, it is contemplated that more than one or each of the light assemblies 12 could both emit the beam of infrared light 116 and have the sensor 120 for sensing the beam of infrared light 116 emitted from another light assembly 12. The beam of infrared light 116 could be emitted for a short period of time (e.g., after stoppage of movement of the light assembly 12a) or periodically. Furthermore, if more than one of the light assemblies 12 emits the beam of infrared light 116, the beams of infrared light 116 for separate light assemblies 12 can be modulated or time shifted to allow the control system 60 for the light assemblies 12 to determine which light assembly 12 is emitting the beam of infrared light 116 that is sensed by the sensor 120.

Figure 20:
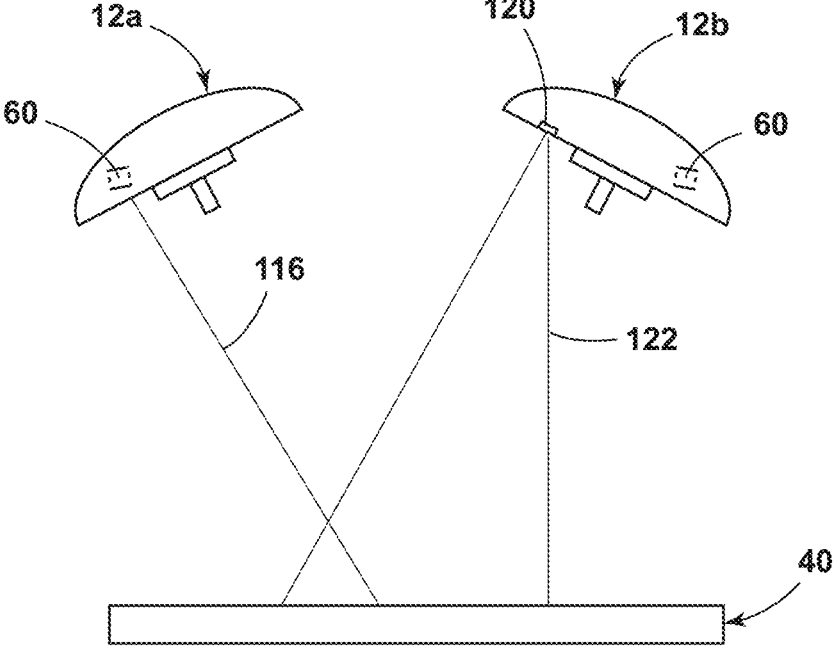
FIG. 20 is a side schematic view of the surgical light of the third embodiment of the present invention illustrating an overlap light and an overlap light sensor.

When the illustrated beam of infrared light 116 emitted from a first one of the light assemblies 12a is sensed by the sensor 120 of a second one of the light assemblies 12b by being in the field of view 122 of the sensor 120 (see FIG. 20), the control system 60 for the second one of the light assemblies 12b will alter the output of the second one of the light assemblies 12b (and/or instruct the control system 60 to alter the output of the first one of the light assemblies 12a). For example, the second one of the light assemblies 12b (and/or the first one of the light assemblies 12a) could lower the intensity of the output of the light emitting assemblies 27 thereof. It is contemplated that the control systems 60 for the light assemblies 12a, 12b could use a time of flight calculation for the beam of infrared light 116 to determine the distance between the infrared light emitter and the sensor 120 (i.e., the distance between the infrared light emitter and the sensor 120 can be determined by the time difference between when the beam of infrared light 116 is emitted and when the beam of infrared light 116 is sensed by the sensor 120).

In the illustrated example, the alteration of the light output from the light assemblies 12 can be adjusted depending on the distance between the infrared light emitter and the sensor 120. For example, if the distance between the infrared light emitter and the sensor 120 is greater than twice the distance D to the focal area 30, then the object 40 is farther than the distance D to the light assembly 12. Therefore, the intensity of light before alteration of the light at the object 40 is less than if the object 40 was at the distance D to both light assemblies 12a, 12b. Accordingly, the intensity of at least one of the light assemblies 12a, 12b can be lowered to a value less than if the object 40 was at the distance D to both light assemblies 12a, 12b. Each of the light assemblies 12 could also include a distance sensor for sensing their individual distance to the object 40 (e.g., using the distance sensor of the first embodiment of the present invention) to assist in optimally altering the light emitted therefrom. It is also contemplated that the visible light emitted from the light assemblies 12a, 12b can be altered differently depending on the intensity of the beam of infrared light 116 as sensed by the sensor 120 (which can, for example, indicate the reflectivity of the object 40 at the point hit by the beam of infrared light 116). It is further contemplated that other wavelengths of light could be employed other than or in addition to infrared light.

In the third embodiment of the present invention, a grid of light or similar design can be emitted from at least one of the light assemblies 12 and sensed by another of the light assemblies 12 to determine the location of the area of overlap 102. If the location of the area of overlap 102 can be determined, the light assemblies 12 can make a non-uniform alteration of the light emitted therefrom to adjust the intensity of the light at the area of overlap 102.

Figure 21:
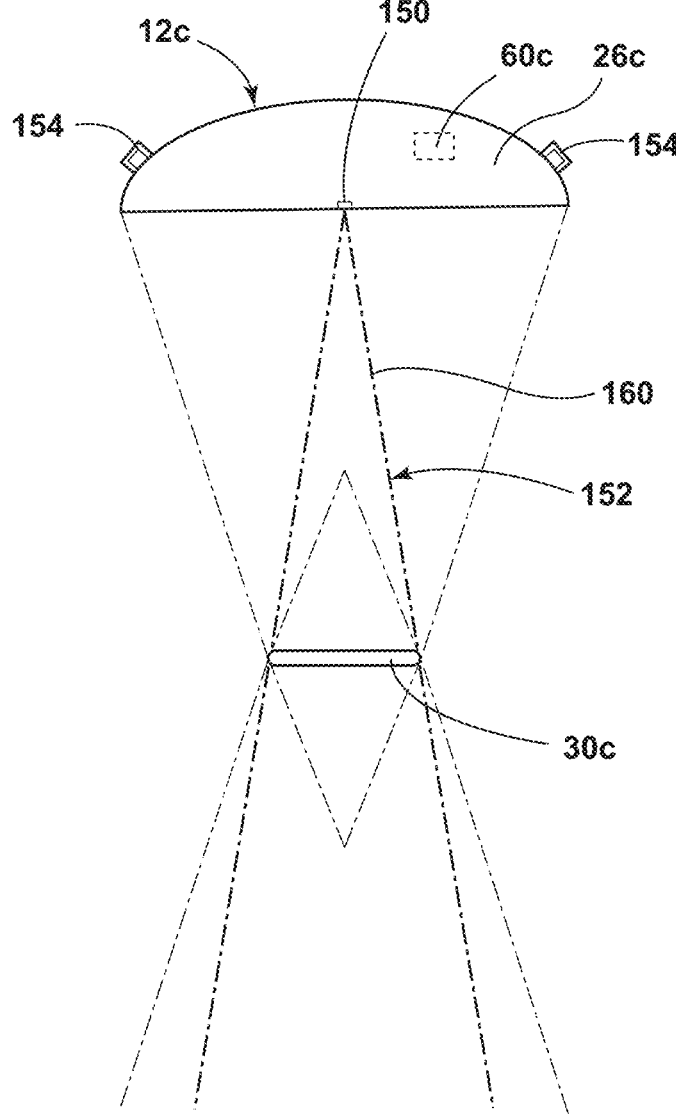
FIG. 21 is a side schematic view of the surgical light of the third embodiment of the present invention emitting a grid of light.

FIG. 21 illustrates a first light assembly 12c that includes a grid projector 150 for selectively projecting a grid of light 152 (e.g., infrared light). The illustrated first light assembly 12c does not include the centrally located handle, but includes handles 154 connected to the housing 26c. Removing the centrally located handle allows the grid projector 150 to be centrally located. However, it is contemplated that the grid projector 150 could be non-centrally located if the light assembly 12c included the centrally located handle. Furthermore, it is contemplated that the grid projector 150 could be located at a distal end of the centrally located handle. FIG. 22 illustrates the grid of light 152 as viewed when projected onto a solid object (e.g., the object 40). The grid of light 152 as illustrated in FIG. 22 includes a plurality of horizontal lines 156a, 156b, 156c, etc. and a plurality of vertical lines 158a, 158b, 158c, etc. The lines of the grid of light 152 are referred to as being vertical or horizontal for purposes of discussion, as the lines would move to different relative positions as the first light assembly 12c is moved. The ends of the horizontal lines and the vertical lines form a virtual circle 160 (shown in the projection in FIG. 21). As illustrated in FIG. 21, the virtual circle 160 is substantially co-extensive with the periphery of the focal area 30c as the grid of light 152 passes through the focal area 30c. However, it is contemplated that the ends of the horizontal lines and the vertical lines could form another shape (e.g., a square).

Figure 23:
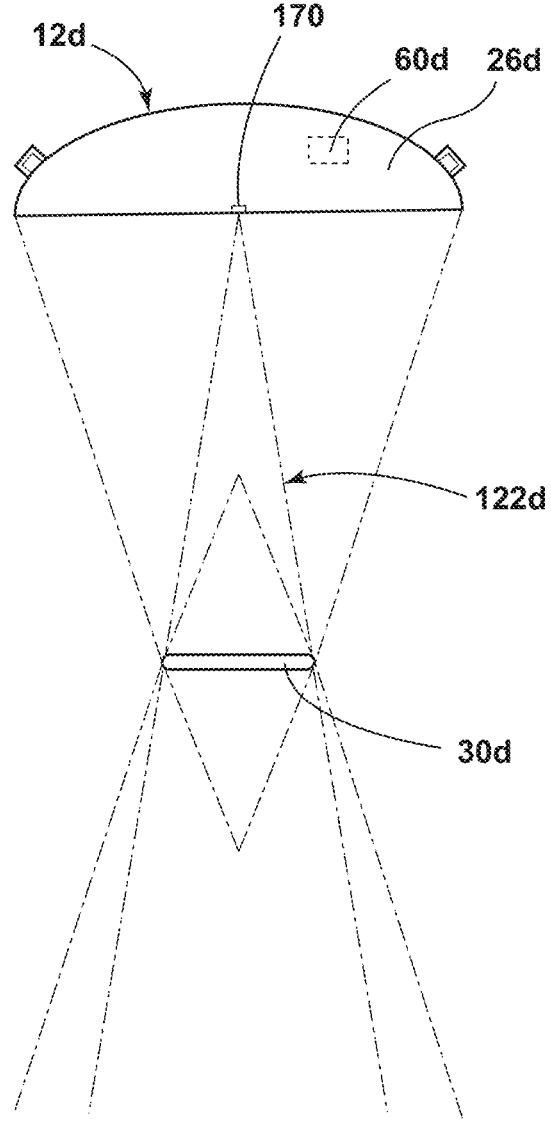
FIG. 23 is a side schematic view of the surgical light of the third embodiment of the present invention with a grid sensor.

The illustrated grid of light 152 is viewed by a second light assembly 12d (FIG. 23). The second light assembly 12d is substantially identical of the first light assembly 12c, but includes a grid sensor 170 (e.g., CCD or any other sensor or camera for sensing the grid of light 152) instead of the grid projector 150. The grid sensor 170 has a field of view 122d for viewing the grid of light 152 reflected off of the object 40 within the field of view 122d. As illustrated in FIG. 23, the field of view 122d has a periphery that is substantially co-extensive with the periphery of the focal area 30d at the focal area 30d. While the grid sensor 170 is illustrated as being centrally located on the second light assembly 12*d*, it is contemplated that the grid sensor 170 could be non-centrally located if the light assembly 12*d* included the centrally located handle. Furthermore, it is contemplated that a plurality of grid projectors 150 and/or grid sensors 170 could be used with each light assembly 12.

When the light emitted from the first light assembly 12*c* and the second light assembly 12*d* overlap at the area of overlap 102 (see FIG. 24) at the object 40, a portion of the grid of light 152 will be viewed by the grid sensor 170. When the grid of light 152 is sensed by the grid sensor 170, the control system 60*d* for the second light assembly 12*d* will alter the output of the second light assembly 12*d* (and/or instruct the control system 60*d* to alter the output of the first light assembly 12*c*). For example, the second light assembly 12*d* (and/or the first light assembly 12*c*) could lower the intensity of the output of the light emitting assemblies 27 thereof.

The illustrated second light assembly 12*d* can examine the position of the grid of light 152 within the field of view 122*d* to alter the output of the first light assembly 12*c* only at the area of overlap 102. As illustrated in FIG. 24, only the vertical line 158*e* and the horizontal lines 156*b*, 156*c* and 156*d* are located in the area of overlap 102. It is contemplated that the grid projector 150 could provide an output that differentiates the different lines of the grid of light 152 such that the grid sensor 170 would be able to determine which lines of the grid of light 152 are being sensed. For example, each of the lines of the grid of light 152 could be output from the grid projector 150 at different times known by the grid sensor 170 such that the grid sensor 170 would know which lines of the grid of light 152 are being sensed. In the example of FIG. 24, the vertical line 158*e* and the horizontal lines 156*b*, 156*c* and 156*d* would be sensed and the grid sensor 170 would determine that these lines are being sensed as these lines are projected at different times than the remaining lines (156*a*, 156*e*, 158*a*, 158*b*, 158*c* and 158*d* in the present example). It is contemplated that the grid projector 150 could employ other means of differentiating the lines (e.g., using different wavelengths for each line).

In the illustrated example, once the area of overlap 102 is known, the first light source 12*c* can be controlled to adjust the intensity of the light emitting assemblies 27 that emit light in the area of overlap 102. In the present example, the light emitting assemblies 27 that emit light in the virtual circle 160 between the area of overlap 102 (e.g., including the light emitting assemblies 27 that emit light in the area between the virtual circle 160 and the vertical line 158*e*, below the horizontal line 156*b*, and above the horizontal line 156*c*). Therefore, the intensity of light in the area of overlap 102 will lower the lux of the light at the area of overlap 102 at or below a recommended level. Once again, a distance sensor can be employed to sense a distance of the light assemblies 12*c*, 12*d* to the object 40 (e.g., a distance from either or both of the light assemblies 12*c*, 12*d* to the object 40 or the total distance from the first light assembly 12*c* to the object 40 and then to the second light assembly 12*d*) in order to optimize the alteration of the intensity output from the light assemblies 12*c*, 12*d*. The distance could alternatively be estimated by measuring a size of the grid. The reflectivity of the object 40 can also be measured to optimize the alteration of the intensity output from the light assemblies 12*c*, 12*d*. Moreover, the angle of the first light assembly 12*c* can be sensed by the second light assembly 12*d* because the squares defined between a pair of adjacent horizontal lines 156*a*, 156*b*, 156*c*, etc. and a pair of adjacent vertical lines 158*a*, 158*b*, 158*c*, etc. will become more rectangular as the relative angles between the light emitted from the first light assembly 12*c* and the second light assembly 12*d* become greater (that is, the apparent distance between a pair of adjacent lines will become smaller as the angle of the first light assembly 12*c* and/or the second light assembly 12*d* moves away from directly over the object 40). The relative orientations of the first light assembly 12*c* and the second light assembly 12*d* can be used to optimize the alteration of the intensity output from the light assemblies 12*c*, 12*d*.

In the third embodiment of the present invention, it is contemplated that the first light assembly 12*c* and the second light assembly 12*d* could both have the grid projector 150 and the grid sensor 170. Therefore, the light assemblies 12*c*, 12*d* would be able to determine the light emitting assemblies 27 that emit light from each of the light assemblies 12*c*, 12*d* in the area of overlap 102. Accordingly, each or both of the light assemblies 12*c*, 12*d* could be adjusted as outlined above to optimize the alteration of the intensity output from the light assemblies 12*c*, 12*d*. It is contemplated that the grid projectors 150 could emit the grid of light 152 at different times so that each of the light assemblies 12*c*, 12*d* would be able to determine the exact location of the other of the light assemblies 12*c*, 12*d* (e.g., by comparing the location of a grid of light 152 projected by a first one of the light assemblies 12 with a grid of light projected by a second one of the light assemblies 12).

FIG. 25 illustrates a method 200 of adjusting light emitted from a surgical light. The method 200 includes emitting first visible light from the first light assembly 12*c* and emitting second visible light from the second light assembly 12*d* at step 202. The method 200 also includes emitting an overlap signal from the first light assembly 12*c* at step 204. The method 200 then includes sensing the overlap signal with the sensor at step 206. If the sensor does not sense the overlap signal at decision step 208, the first light assembly 12*c* and the second light assembly 12*d* do not adjust the output of light therefrom at step 210. If the sensor does sense the overlap signal at decision step 208, the method 200 includes adjusting the first visible light and/or the second visible light at step 212.

The present invention provides for adjustment of the surgical light 10 to optimize the object 40 being viewed. In the first embodiment of the present invention, the light emitted from the surgical light 10 can be adjusted depending on the distance between the surgical light 10 and the object 40 being viewed. In the second embodiment of the present invention, the surgical light 10 can be moved to optimize the direction of light emitted from the surgical light 10, especially when the area of interest is in a cavity. In the third embodiment of the present invention, the light emitted from a pair of light assemblies can be adjusted to ensure that the intensity of the light at the area of overlap of the light assemblies stays below a predetermined level to help prevent eye fatigue and dehydration and excessive radiation of a bodily area at the area of overlap 102. It is contemplated that any of the first, second and/or third embodiments can be combined into a single embodiment.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A method of illuminating an object comprising:

illuminating the object with light emitted from a plurality of first light sources of a surgical light, the plurality of first light sources being mounted to a housing of the surgical light;

turning on a plurality of second light sources of the surgical light to illuminate the object with light from the plurality of second light sources, each of the plurality of second light sources emitting narrowly collimated light that is narrower than the light emitted from the plurality of first light sources and converges at a focal distance of the plurality of first light sources;

adjusting a position of the surgical light to illuminate an area of interest of the object with the light from the plurality of first light sources by moving the housing of the surgical light so as to have the narrowly collimated light from the plurality of second light sources form a dot at the area of interest of the object, thereby positioning the plurality of first light sources to illuminate the area of interest of the object at the focal distance of the plurality of first light sources; and turning off the plurality of second light sources while continuing to illuminate the area of interest of the object with the light from the plurality of first light sources.

2. The method of illuminating an object of claim 1, wherein the plurality of second light sources turn off after a handle of the surgical light is released.

3. The method of illuminating an object of claim 2, wherein the plurality of second light sources turn off a predetermined time after the handle is released.

4. The method of illuminating an object of claim 1, wherein the narrowly collimated light from each of the plurality of second light sources comprises laser light.

5. The method of illuminating an object of claim 1, wherein turning on the plurality of second light sources occurs in response to a user pressing a button located on a handle of the surgical light.

6. The method of illuminating an object of claim 1, further comprising monitoring the narrowly collimated light from the plurality of second light sources at the area of interest of the object by a sensing system of the surgical light.

7. The method of illuminating an object of claim 6, further comprising automatically providing user feedback based on the monitoring of the narrowly collimated light from the plurality of second light sources at the area of interest.

8. The method of illuminating an object of claim 7, wherein the user feedback comprises an audible sound.

9. The method of illuminating an object of claim 7, wherein the user feedback comprises vibration.

10. The method of illuminating an object of claim 7, wherein the user feedback comprises a visual indicator.

11. The method of illuminating an object of claim 7, wherein the sensing system comprises a camera.

12. A surgical light comprising:

a housing;

a plurality of first light sources that are mounted on the housing and emit illumination light for illuminating an object; and a plurality of second light sources that emit narrowly collimated light that is narrower than the light emitted from the plurality of first light sources and converges at a focal distance of the plurality of first light sources such that an area of interest of the object is illuminated with the light from the plurality of first light sources by moving the housing of the surgical light so as to have the narrowly collimated light from the plurality of second light sources form a dot at the area of interest of the object, thereby positioning the plurality of first light sources at the focal distance of the plurality of first light sources.

13. The surgical light of claim 12, wherein the narrowly collimated light comprises laser light.

14. The surgical light of claim 12, wherein the surgical light is configured to activate the plurality of second light sources after user engagement with the surgical light.

15. The surgical light of claim 12, wherein the surgical light is configured to turn off the plurality of second light sources a predetermined time after a handle of the surgical light has been released.

16. The surgical light of claim 15, wherein the predetermined time is at least 5 seconds.

17. The surgical light of claim 14, wherein a handle of the surgical light comprises a button and the plurality of second light sources are configured to turn on when the button is pressed.

18. The surgical light of claim 12, further comprising a user feedback system for guiding a user when a user is adjusting the surgical light such that the narrowly collimated light emitted from the plurality of second light sources forms the dot on the object.

19. The surgical light of claim 18, further comprising a sensing system that monitors the narrowly collimated light and a control system that activates the user feedback system based on signals received from the sensing system.

20. The surgical light of claim 19, wherein the control system is configured to activate the user feedback system in response to the sensing system sensing that the narrowly collimated light is diverging from the dot on the object.

21. The surgical light of claim 19, wherein the control system is configured to activate the user feedback system in response to the sensing system sensing that the narrowly collimated light is converging to form the dot on the object.

22. The surgical light of claim 19, wherein the user feedback system is configured to emit an audible sound.

23. The surgical light of claim 19, wherein the user feedback system is configured to vibrate a handle of the surgical light.

24. The surgical light of claim 19, wherein the user feedback system is a visual indication system configured to display a visual indicator.

25. The surgical light of claim 19, wherein the sensing system comprises a camera.

26. A method of illuminating an object comprising:

illuminating the object with light emitted from a plurality of first light sources of a surgical light, the plurality of first light sources being mounted to a housing of the surgical light;

turning on a plurality of second light sources of the surgical light to illuminate the object with light from the plurality of second light sources, each of the plurality of second light sources being fixed in position relative to the housing of the surgical light and oriented such that light from the plurality of second light sources meets at a focal distance of the plurality of first light sources;

adjusting a position of the surgical light to illuminate an area of interest of the object with the light from the plurality of first light sources by moving the housing of the surgical light so as to have the plurality of second light sources form a dot at the area of interest of the object, thereby positioning the plurality of first light sources to illuminate the area of interest of the object at the focal distance of the plurality of first light sources; and turning off the plurality of second light sources while continuing to illuminate the area of interest of the object with the light from the plurality of first light sources.

27. The method of claim 1, wherein, prior to adjusting the position of the surgical light to illuminate the area of interest of the object with the light from the plurality of first light sources, the narrowly collimated light from the plurality of second light sources forms a plurality of non-overlapping dots on the object.

* * * * *